United States Patent [19]

Matsumoto et al.

[11] Patent Number: 5,226,987
[45] Date of Patent: Jul. 13, 1993

[54] RADIAL TIRE FOR HEAVY LOAD VEHICLES INCLUDING A RUBBER REINFORCING LAYER BETWEEN BELT AND TREAD

[75] Inventors: Yo Matsumoto; Tetsuto Ueno; Ryo Muramatsu, all of Itami, Japan

[73] Assignee: Toyo Tire & Rubber Company Limited, Osaka, Japan

[21] Appl. No.: 715,051

[22] Filed: Jun. 12, 1991

Related U.S. Application Data

[63] Continuation of Ser. No. 362,984, Jun. 8, 1989, abandoned.

[30] Foreign Application Priority Data

Jul. 27, 1988 [JP] Japan .................. 63-187649

[51] Int. Cl.$^5$ .................. B60C 9/18; B60C 11/18
[52] U.S. Cl. .................. 152/209 R; 152/532; 152/537
[58] Field of Search .................. 152/209 R, 532, 537

[56] References Cited

U.S. PATENT DOCUMENTS

| 4,396,052 | 8/1983 | Ahagon et al. | 152/537 |
| 4,602,063 | 7/1986 | Yamamoto | 152/151 |

FOREIGN PATENT DOCUMENTS

| 1169343 | 6/1984 | Canada | 152/537 |
| 49-31041 | 8/1974 | Japan | 152/537 |
| 54-38004 | 3/1979 | Japan | 152/209 R |
| 60-116506 | 6/1985 | Japan | 152/209 R |
| 63-247102 | 10/1988 | Japan . | |

Primary Examiner—Michael W. Ball
Assistant Examiner—Adrienne C. Johnstone
Attorney, Agent, or Firm—Armstrong, Westerman, Hattori, McLeland & Naughton

[57] ABSTRACT

A radial tire for heavy load vehicles having a steel cord-reinforced belt interposed between the carcass of radial structure and the tread, which comprises a rubber reinforcing layer extending from the center toward the edges along the inside of the tread and having at least one quarter the tread width, said rubber reinforcing layer being made of a rubber composition containing resorcin or a resorcin derivative as a reinforcing agent in addition to carbon black and silica and also containing hexamethylenetetramine or a melamine derivative as a methylene donor, said rubber reinforcing layer having a reinforcing factor of 2.2 to 5.7 which is defined by $\sqrt{E'} \cdot d$ [where $E'$ denotes the dynamic modulus (MPa) of the rubber reinforcing layer and d denotes the thickness (mm) of the rubber reinforcing layer].

1 Claim, 1 Drawing Sheet

RADIAL TIRE FOR HEAVY LOAD VEHICLES INCLUDING A RUBBER REINFORCING LAYER BETWEEN BELT AND TREAD

This application is a continuation of application Ser. No. 362,984 filed Jun. 8, 1989 now abandon.

The present invention relates to a radial tire for heavy load vehicles which has a rubber reinforcing layer between the tread and the belt. The rubber reinforcing layer at the center of the tread is especially superior in cut resistance, adhesion, and low heat generation. Because of this characteristic property, the radial tire is suitable for use on unpaved roads.

Despite their good abrasion resistance, radial tires become unusable sooner than bias tires on account of the belt separation which takes place while the tread still remains partially. This problem has been addressed by improving the tread or steel cord-embedding rubber. For example, an improved tread is of dual layer structure, with the inner layer (base tread adjacent to the belt) being made of a rubber composition which is saved from heat generation at the sacrifice of abrasion resistance, and the outer layer (cap tread) being made of a rubber composition of high abrasion resistance. Also, an improved steel cord-embedding rubber is made of a rubber composition containing an adhesive such as a cobalt salt of an organic acid, hydroxybenzoic acid, and resorcin, which increases adhesion between rubber and steel cord. These improvements, however, are not completely successful.

Not only is it necessary that adhesion between rubber and steel cord be high, but it is also necessary that a decrease in adhesion be as small as possible while tires are in use. In actuality, tires containing a steel cord-embedding rubber with good adhesion occasionally lose the initial adhesion to a great extent after their use. The following are the possible reasons whey adhesion between steel cord and rubber decreases while tires are in use, (1) Tires are subject to many minute cuts when they run over gravel or sharp objects. The cuts reaching the inside of the tread permit air and moisture to infiltrate into the tire, promoting the aging and fatigue of the embedding rubber and also rusting the steelcord. All this leads to a decrease in adhesion.

(2) The adhesion improver incorporated into the steel cord-embedding rubber diffuses and migrates into the tread rubber during vulcanization or tire use. This leads to a decrease in adhesion.

(3) The softener and other additives incorporated into the tread migrate into the steel cord-embedding rubber. This also leads to a decrease in adhesion.

An object of the present invention is to provide a radial tire for heavy load vehicles characterized by good adhesion between steel cord and steel cord-embedding rubber, said adhesions lasting long with only a small loss while tires are in use.

An another object of the present invention is to provide a radial tire for heavy load vehicles which is superior in cut resistance and separation resistance.

The above and other objects of the invention will become apparent from the following description.

BRIEF SUMMARY OF THE INVENTION

The present invention provides a radial tire for heavy load vehicles having a steel cord-reinforced belt interposed between the carcass of radial structure and the tread, which comprises a rubber reinforcing layer extending from the center toward the edges along the inside of the tread and having at least one quarter the tread width, said rubber reinforcing layer being made of a rubber composition containing 0.5 to 3 parts by weight of resorcin or a resorcin derivative as a reinforcing agent in addition to carbon black and silica for 100 parts by weight of rubber and also containing hexamethylenetetramine or a melamine derivative as a methylene donor in an amount (by weight) which is 0.8 to 2 times as much as the resorcin or resorcin derivative, said rubber reinforcing layer having a reinforcing factor of 2.2 to 5.7 which is defined by $\sqrt{E'} \cdot d$ [where $E'$ denotes the dynamic modulus (MPa) of the rubber reinforcing layer and d denotes the thickness (mm) of the rubber reinforcing layer].

BRIEF DESCRIPTION OF THE DRAWINGS

The radial tire of the present invention has a section as shown in FIG. 1 or FIG. 2.

The one shown in FIG. 1 has the tread 1 which is entirely backed with the rubber reinforcing layer 3, and the one shown in FIG. 2 has the tread 1 which is partly backed with the rubber reinforcing layer 3.

DESCRIPTION OF THE PREFERRED EMBODIMENT

Figure 1:
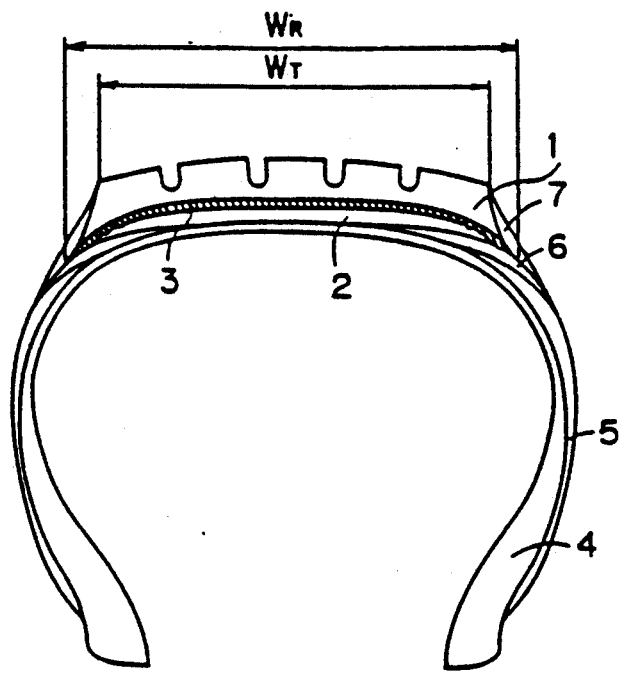
In FIGS. 1 and 2, WR denotes the width of the rubber reinforcing layer 3 and WT, the width of the tread 1. There are also shown the belt 2, the carcass 4, the side wall 5, the pad rubber 6, and the skirt sheet 7.

According to the present invention, a rubber reinforcing layer is interposed between the tread and the belt, and that part of the reinforcing layer which backs the tread center which is most liable to cuts is made of a rubber composition which has a high dynamic modulus $E'$ and yet generates a comparatively small amount of heat. The reinforcing layer should be as thick as possible unless it produces adverse effects, so that it provides the maximum resistance to minute cuts. In addition, the rubber composition for the reinforcing layer is incorporated with an additive which increases the dynamic modulus $E'$, prevents decrease in adhesion between rubber and steel cord, and suppresses heat generation. The reinforcing layer also functions as a barrier to prevent the migration from the tread of any substance which lowers adhesion between rubber and steel cord and as a barrier to confine the adhesion improver in the belt. These means are to keep high adhesion between rubber and steel cord.

According to the present invention, the rubber reinforcing layer should have at least one quarter the tread width and extend from the center toward the edges. along the inside the tread. The rubber reinforcing layer should preferably be made of natural rubber, isoprene rubber, styrene-butadiene rubber, or butadiene rubber. The rubber should be incorporated with a reinforcer such as carbon black and silica. The rubber should contain 0.5 to 3 parts by weight of resorcin or a resorcin derivative for 100 parts by weight of the rubber. The rubber should also contain hexamethylene-tetramine or a melamine derivative as a methylene donor in an amount (by weight) which is 0.8 to 2 times as much as the resorcin or resorcin derivative. The rubber reinforcing layer is characterized by a reinforcing factor of 2.2 to 5.7 which is defined by $\sqrt{E'} \cdot d$ [where $E'$ denotes the dynamic modulus (MPa) of the rubber reinforcing layer and d denotes the thickness (mm) of the rubber reinforcing layer].

The above-mentioned resorcin derivative includes, for example, a polycondensate of resorcin and formalin, and a melt mixture of a polycondensate of resorcin and formalin and an alkylphenol-formaldehyde resin. The melamine derivative includes, for example, a partially etherified product of methylolmelamine, and a compound obtained by methoxylating with methanol a reaction product of melamine and formalin. A preferred melamine derivative is one which contains 4 to 6 formalin molecules and 2 to 6 methoxy groups per melamine molecule and also contains 60 to 90% of monomer.

The center of the tread is more liable to cuts than the edge of the tread when the tire runs over gravel because the tread is curved not only in the direction of tire circumference but also in the direction of its width. The curve permits gravel under the edge of the tread to escape but does not permit gravel under the center of the tread to escape. For this reason, it is necessary to reinforce the center of the tread. According to the present invention, the reinforcing layer should having at least one quarter the tread width at the center of the tread; otherwise, the desired reinforcing effect is not produced. Preferably, the rubber reinforcing layer should cover the entire width of the tread, so that it provides resistance to minute cuts and prevents the migration of a softener and other additives from the tread.

The rubber reinforcing layer is thin, soft, and sticky before vulcanization, and hence it is hard to handle along, However, it can be handled easily if its calendered sheet is laminated directly onto the back of the tread in the tread extrusion step. The rubber reinforcing layer should preferably be almost as wide as the back of the tread, because it increases adhesion between tread and side wall rubber or carcass cord -embedding rubber.

With resorcin or a resorcin derivative in an amount less than 0.5 part by weight, the rubber composition greatly decreases in adhesion between steel cord and rubber while tires are running. Resorcin or a resorcin derivative in excess of 3 parts by weight does not increase the reinforcing effect in proportion to the amount or cost increased. With hexamethylenetetramine or a melamine derivative in an amount less than 0.8 times (by weight) the amount of resorcin or a resorcin derivative, the rubber composition permits resorcin or a resorcin derivative to remain partially unreacted. Even though their amount is more than twice, the rubber composition is not improved but becomes liable to scorching.

With a reinforcing factor small than 2.2 (which is defined by $\sqrt{E'} \cdot d$), the rubber reinforcing layer is poor in cut resistance and is small in improvement effect. With a reinforcing factor greater than 5.7, the rubber reinforcing layer generates excess heat, accelerating the aging and fatigue of the belt-embedding rubber, and decreases in separation resistance.

The rubber composition for the reinforcing layer should be incorporated with hard carbon such as HAF-L S, ISAF-LM, ISAF-LS, and HAF carbon blacks. A preferred carbon black is one which has a low iodine adsorption number or a low DBP value. The amount of carbon black and silica is preferably 40 to 80 parts by weight and 5 to 40 parts by weight, respectively, for 100 parts by weight of rubber.

Needless to say, the rubber reinforcing layer may be incorporated, in addition to the above-mentioned components, with any known vulcanizing agent, vulcanization accelerator, accelerator activator, retarder, reinforcer, plasticizer, antioxidant, and tackifier.

The radial tire of the present invention can be produced by any known process except that the above-mentioned rubber reinforcing layer is added. An example of the process is disclosed in U.S. Pat. No. 2493614.

The invention will be described with reference to the following examples and comparative examples, in which "parts" means "parts by weight".

Figure 2:
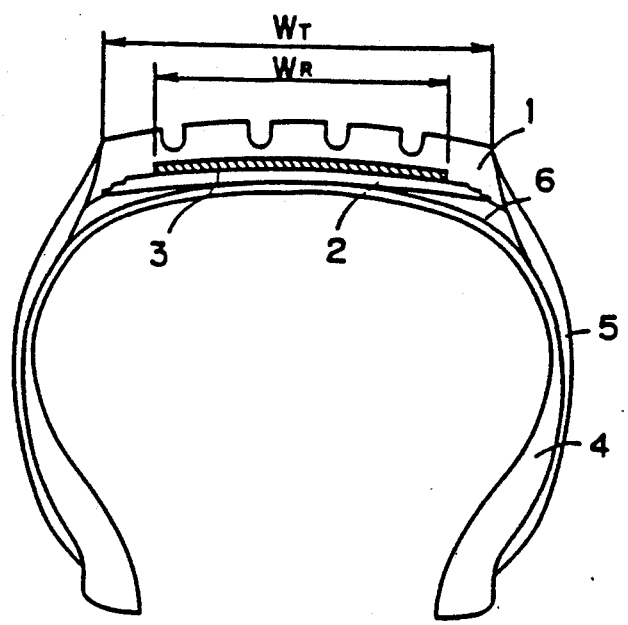

FIGS. 1 and 2 are sectional views showing examples of the redial tire for heavy load vehicles pertaining to the present invention.

EXAMPLES AND COMPARATIVE EXAMPLES

The components shown in Table 1 were mixed using a Banbury mixer. A portion of the composition was molded into test pieces which were examined for items shown in Table 2.

The remainder of the composition was made into two kinds of radial tires (1000R20) each having a section shown in FIG. 1 and FIG. 2. The tires were mounted on a dump truck, which was run until the tire tread wore out. The worn tire was taken apart to see cuts reaching the belt and also to examine the belt edge for separation. The length of separation was measured, if there was any separation. The results are shown in Table 2.

TABLE 1

| Components (parts) | A | B | C | D | E |
|---|---|---|---|---|---|
| Natural rubber | 80 | 80 | 80 | 80 | 80 |
| Isoprene rubber | 20 | 20 | 20 | 20 | 20 |
| Zinc oxide | 10 | 10 | 10 | 10 | 10 |
| Carbon black A (*1) | — | 50 | 50 | 60 | 60 |
| Carbon black B (*2) | 40 | — | — | — | — |
| Silica | 5 | 5 | 10 | 10 | 10 |
| Resorcin | 0.5 | 0.5 | 2 | — | 0 |
| Resorcin derivative (*3) | — | — | — | 3 | — |
| Hexamethylenetetramine | 0.5 | — | — | — | — |
| Melamine derivative (*4) | — | 0.75 | 3 | 4.5 | 0 |
| Cobalt naphthenate | 2 | 2 | 2 | 2 | 2 |
| Antioxidant (6C) (*5) | 1 | 1 | 1 | 1 | 1 |
| Accelerator (DZ) (*6) | 1 | 1 | 1 | 1 | 1 |
| Sulfur | 6 | 6 | 6 | 6 | 6 |
| Stearic acid | — | — | — | — | 3 |

Note to Table 1
(*1) Carbon black A: HAF-LS
(*2) Carbon black B: ISAF-LS
(*3) Resorcin derivative: Polycondensate of resorcin and formalin
(*4) Melamine derivative: Partially etherified product of methylolmelamine
(*5) Antioxide (6C): N-(1,3-dimethylbutyl)-N-phenyl-p-phenylenediamine
(*6) Accelerator (DZ): N,N'-dicyclohexyl-2-benzothiazolylsulfenamide The above-mentioned melamine derivative (*4) was prepared according to the following Reference Example 1.

REFERENCE EXAMPLE 1

Synthesis of melamine derivative

Into a 1-liter three-necked flask equipped with a stirrer, thermometer, and reflux condenser was placed 259.6 g (3.20 mol) of formalin (37%). The formalin was adjusted to pH 9.0~9.5 with a small amount of sodium hydroxide. Then, 50.5 g (0.40 mol) of melamine was added. Using an oil bath, the contents were heated to about 80° C. for refluxing. After refluxing for 60 minutes, the contents were allowed to cool to room temperature, with the oil bath removed, and then 202.6 g (6.33 mol) of methanol was added. The pH of the contents was lowered to 2~3 with sulfuric acid. Methoxylation was performed at about 30° C. for 120 minutes. Water and methanol were removed by distillation under reduced pressure. The reaction product was discharged while hot.

The thus obtained melamine derivative was found to contain 81% of monomer and also contain 5.7 formalin molecules and 4.2 methoxy groups per melamine molecule. (The following methods were used to determine the content of monomer, the number of formalin molecules, and the number of methoxy groups in the melamine derivative.)

The vulcanized test piece was heated at 120° C. for 4 days in air for accelerated aging. The test piece underwent separation test. The result of the separation test was rated according to the covering ratio (or the area of rubber remaining unremoved and covering the cord layer). In control (in which the rubber reinforcing layer is not used), a sheet of the above-mentioned rubber composition was replaced by a sheet of tread rubber. The results are shown in Table 2, in which tires Nos. 1 to 4 pertain to examples, and others, comparative examples.

TABLE 2

| Tire number | 1 | 2 | 3 | 4 | 5 | 6 | 7 | 8 | 9 |
|---|---|---|---|---|---|---|---|---|---|
| Recipe of rubber reinforcing layer | A | B | C | D | E | B | D | C | none |
| Dynamic modulus E' (MPa) | 4.0 | 5.0 | 16.5 | 28.2 | 16.2 | 5.0 | 28.2 | 16.5 | — |
| Rubber covering ratio (%) | 90 | 100 | 100 | 100 | 70 | 100 | 100 | 100 | 70 |
| Thickness (d) of reinforcing layer (mm) | 1.2 | 1 | 2.0 | 1.0 | 1.2 | 0.8 | 2 | 1.5 | — |
| $\sqrt{E' \cdot d}$ | 2.2 | 2.2 | .7 | 5.3 | 4.4 | 2 | 7.5 | 5.0 | — |
| WR/WT × 100(%) | 100 | 110 | 40 | 110 | 100 | 100 | 110 | 30 | — |
| Cut resistance | fair | fair | fair | good | fair | poor | good | poor | bad |
| Length (mm) of separation at belt edge | 2 | 2 | 10 | 3 | 35 | 2 | 50 | 10 | 50 |

Methods for determination

Monomer content: From the area percentage in GPC (gel permiation chromatography)

Amount of connected formalin: After the addition of phosphoric acid, the melamine derivative is distilled to expel formalin. The amount of the expelled formalin is determined by the iodine-sodium thiosulfate titration method.

Number of methoxy groups: The melamine derivative is dissolved in phenol-propionic acid solution. After the addition of hydroiodic acid, the solution is analyzed by the potassium iodide-sodium thiosulfate titration method.

Test methods (1) Dynamic modulus

Tester: Viscoelastic spectrometer, Iwamoto Seisakusho

Test conditions: Initial strain: 15%, amplitude: 1%, frequency: 50 Hz, temperature: 30° C.

(2) Adhesion test

A belt sample was prepared by impregnating steel cords (arranged parallel at intervals of about 1 mm) with the embedding rubber composition. A sheet of the above-mentioned rubber composition was placed on the belt sample, and they were vulcanized using a mold.

We claim:

1. A radial tire for heavy load vehicles having a steel cord-reinforced belt interposed between a carcass of a radial structure and a tread, which includes a rubber reinforcing layer between the belt and the tread extending from the center toward the edges along the inside of the tread and having a width at least one quarter of the tread width, said rubber reinforcing layer being made of a rubber composition containing 0.5 to 3 parts by weight of resorcin or a resorcin derivative, 40 to 80 parts by weight of a carbon black selected from the group consisting of HAF-LS, ISAF-LM, ISAF-LS and HAF carbon blacks, and 5 to 40 parts by weight of silica per 100 parts by weight of rubber, and containing 0.8 to 2 parts by weight of a melamine derivative per part by weight of the resorcin or resorcin derivative, said rubber reinforcing layer having a reinforcing factor of 2.2 to 5.7 which is defined by $\sqrt{E' \cdot d}$, wherein E' denotes a dynamic modulus in MPa of the rubber reinforcing layer and d denotes the thickness in mm of the rubber reinforcing layer.

* * * * *